United States Patent [19]
Allard et al.

[11] Patent Number: 5,490,432
[45] Date of Patent: Feb. 13, 1996

[54] KIT FOR OPERATING UPON BEARINGS

[75] Inventors: Larry D. Allard; Richard K. Granowski, both of Owatonna, Minn.; Thomas J. Neesley, Chatsworth, Calif.

[73] Assignee: Kahr Bearing, a Dover Diversified Company, Tuscon, Ariz.

[21] Appl. No.: 177,555

[22] Filed: Jan. 5, 1994

Related U.S. Application Data

[63] Continuation of Ser. No. 893,767, Jun. 5, 1992, abandoned.
[51] Int. Cl.⁶ .................................................. G01M 13/04
[52] U.S. Cl. ........................... 73/865.9; 73/825; 73/857
[58] Field of Search ................................ 73/865.9, 818, 73/825, 856, 857; 29/898.07, 898.08, 252; 384/8

[56] References Cited

U.S. PATENT DOCUMENTS

| | | | |
|---|---|---|---|
| 2,439,035 | 4/1948 | Bidwell et al. | 73/865.9 X |
| 3,201,996 | 4/1965 | Silvia | 73/865.9 |
| 3,580,059 | 5/1971 | Dalton | 73/672 |
| 3,680,930 | 8/1972 | Campbell | 29/898.08 X |
| 3,691,604 | 9/1972 | Spontelli | 29/252 X |
| 3,824,665 | 7/1974 | Saito | 29/252 |
| 4,089,211 | 5/1978 | Vercellone et al. | 73/865.9 X |
| 4,302,963 | 12/1981 | Collins | 73/1 J |
| 4,318,212 | 3/1982 | Schnabel | 29/252 |
| 4,337,559 | 7/1982 | Rangel | 29/898.044 |
| 4,565,089 | 1/1986 | Arciszewski et al. | 73/863 X |

FOREIGN PATENT DOCUMENTS

| | | | |
|---|---|---|---|
| 241702 | 4/1969 | U.S.S.R. | 73/865.9 |
| 245381 | 6/1969 | U.S.S.R. | 73/865.9 |
| 652380 | 3/1979 | U.S.S.R. | 73/865.9 |
| 692967 | 10/1979 | U.S.S.R. | 73/865.9 |
| 903731 | 2/1982 | U.S.S.R. | 73/865.9 |
| 1513383 | 10/1989 | U.S.S.R. | 73/865.9 |

*Primary Examiner*—Thomas P. Noland
*Attorney, Agent, or Firm*—Ellsworth R. Roston; Charles H. Schwartz

[57] ABSTRACT

A first kit includes a manually operable hydraulic pump, a hose and a fitting for transferring the pressure in the pump to the hose. A second tool kit for bearings of relatively small size includes a fitting for coupling to the hose in the first kit and a C-shaped clamp having a pair of legs movable toward each other in accordance with increases in pump pressure. A third kit includes a receiver die and a driver die movable with the clamp legs to remove a bearing from a housing, an anvil die and a driver die for installing a bearing in a housing and a die set for swaging a prepared lip in a bearing race into a prepared chamfer in a housing. A fourth tool kit for bearings of relatively large size includes a fitting for coupling to the hose in the first kit and an in-line press having a pair of legs movable toward each other in accordance with increases in pump pressure. A fifth kit includes a receiver die, a pull-rod shaft and a driver die movable with the legs in the press to remove a bearing from, or install a bearing in, a housing. Dies in the fifth kit operate with the pull-rod shaft to swage a prepared lip in a bearing race into a prepared chamfer in a housing. Systems including the different kits may also be proof tested to proper operation.

12 Claims, 6 Drawing Sheets

KIT FOR OPERATING UPON BEARINGS

This is a continuation of application Ser. No. 07/893,767, filed Jun. 5, 1992, and now abandoned.

This invention relates to kits for performing operations on bearings including installing and centering the bearings in a housing, removing the bearing from the housing and swaging a prepared lip in a bearing race into a prepared chamfer in a housing. The invention also relates to a method of using such kits to perform such operations.

BACKGROUND OF THE INVENTION

Bearings are in universal use for providing a movement of one member relative to another with low friction. The bearings have different sizes. Different types of operations are generally performed on bearings. For example, the bearings are normally installed in a housing. The bearings may also have to be removed from the housing. Many bearings are further secured in their housings by swaging a prepared lip in the bearing race into a prepared chamfer in the housing.

Until now, the operations specified in the previous paragraph have been performed in a cumbersome manner. Furthermore, the apparatus for performing such operations has often been large, thereby requiring considerable space, and has further required a considerable amount of set-up time to operate upon different bearings. The apparatus has usually been stationary so that the bearings have had to be transported to the stationary apparatus for processing. The apparatus of the prior art has also had other disadvantages. For example, the apparatus may not produce swages of the desired shape. Underswaging can result in inadequate retention of the bearing. Overswaging can cause torque problems. The disadvantages of such apparatus have been acknowledged for some time but no resolution of such disadvantages has been forthcoming.

This invention provides a kit arrangement for performing operations on bearings in a straightforward manner at any location and without the need for large or expensive equipment. The kits are compact, relatively light and easily transportable. The kits provide for such operations on bearings as installing the bearings in housings, removing the bearings from the housings and swaging prepared lips in bearing races into prepared chamfers in housings.

BRIEF DESCRIPTION OF THE INVENTION

In one embodiment of the invention, a first kit includes a manually operable hydraulic pump, a hose and a fitting for transferring the pressure in the pump to the hose. A second tool kit for bearings of relatively small size includes a fitting for coupling to the hose in the first kit and a C-shaped clamp having a pair of legs movable toward each other in accordance with increases in pump pressure.

A third kit includes a receiver die and a driver die movable with the clamp legs to remove a bearing from a housing, an anvil die and a driver die for installing a bearing in a housing and a die set for swaging a prepared lip in a bearing race into a prepared chamfer in a housing. A fourth tool kit for bearings of relatively large size includes a fitting for coupling to the hose in the first kit and an in-line press having a pull rod shaft which draws down in accordance with increases in pump pressure. A fifth kit includes a receiver die and a driver die movable with the legs in the press to remove a bearing from, or install a bearing in, a housing. Dies in the fifth kit operate with the pull-rod shaft to swage a prepared lip in a bearing race into a prepared chamfer in a housing.

DETAILED DESCRIPTION OF THE INVENTION

In one embodiment of the invention, a plurality of kits generally indicated at 10 (FIG. 3), 12 (FIG. 4) and 14 (FIG.

Figure 9:
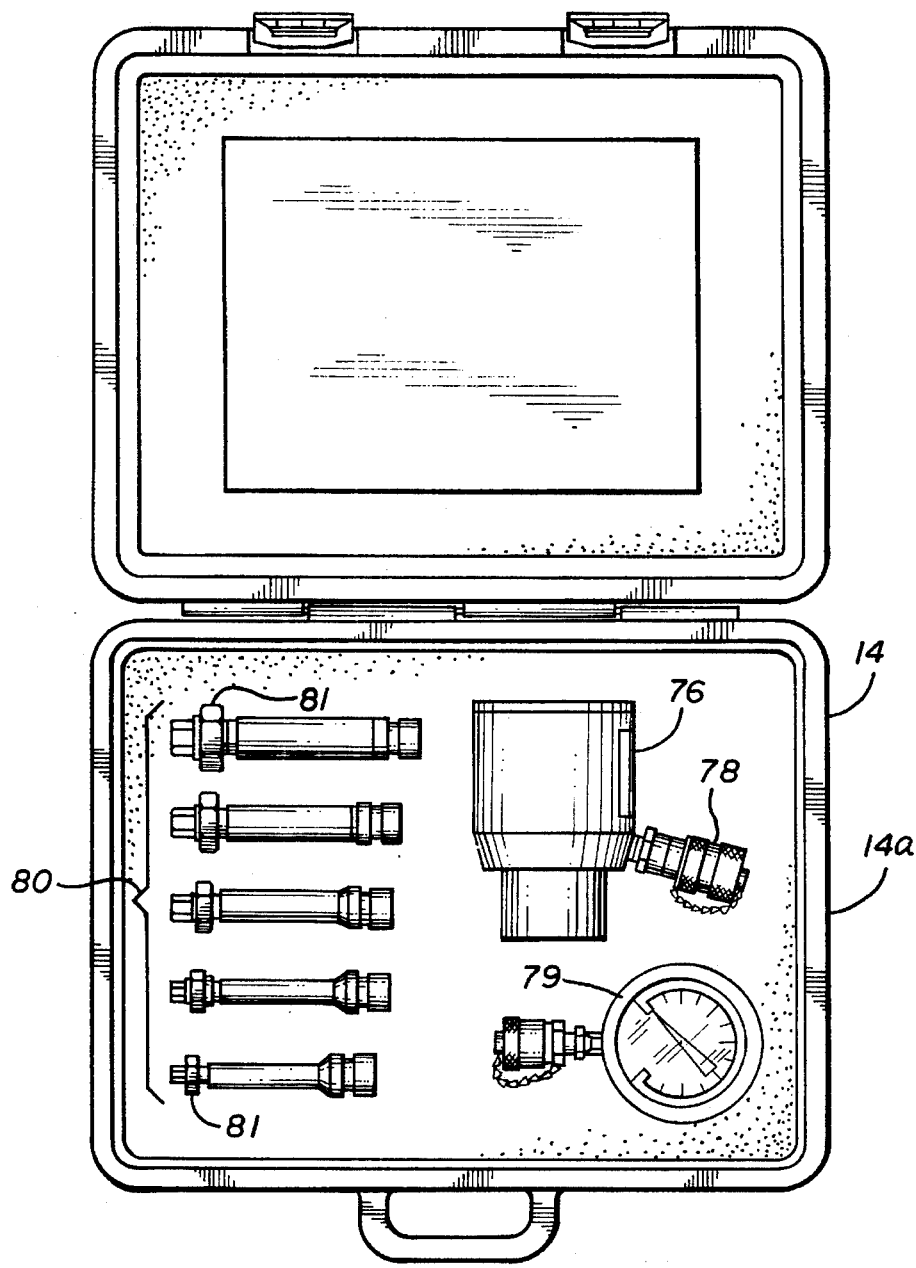
FIG. 9 is a plan view of a fourth tool kit, in an open position of the box housing the tool kit, containing different members cooperative in an assembled relationship with the members of FIG. 3 for installing and centering a bearing of relatively large size in a housing, removing a bearing of relatively large size from a housing or swaging a prepared lip in a bearing race of relatively large size into a prepared chamfer in a housing.
Figure 10:
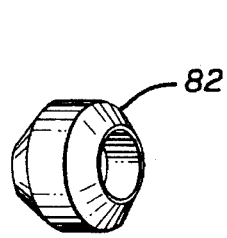
FIGS. 10–12 are plan views of different receiver dies, driver dies and swaging dies which may be included in a fifth kit for use with the tool kit shown in FIG. 9 in installing a bearing of relatively large size in a housing, removing a bearing of relatively large size from a housing or swaging a prepared lip in a bearing race of relatively large size into a prepared chamfer in a housing.
Figure 11:
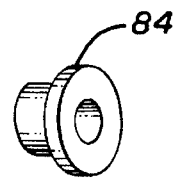
Figure 12:
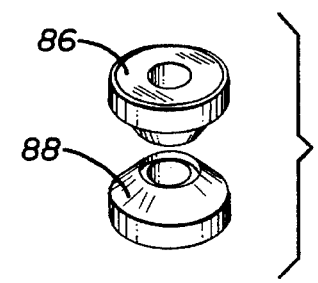

9) are provided. Each of the kits 10, 12 and 14 is respectively disposed within a box 10a (FIG. 3), a box 12a (FIG. 4) and a box 14a (FIG. 9). The kit 10 is constructed to provide a hydraulic pressure when manually operated. The kit 12 is constructed to operate to remove a bearing of relatively small size from a housing, install a bearing of relatively small size in a housing or swage a prepared lip in a bearing race into a prepared chamfer in a housing, all by the application of hydraulic pressure from the kit 10. For example, the bearings may have sizes of approximately one quarter of an inch (¼") to one half of an inch (½").

The kit 14 is constructed to operate to remove a bearing of relatively large size from a housing, install a bearing of relatively large size in a housing or swage a prepared lip in a bearing race of relatively large size into a prepared chamfer in a housing, all by the application of hydraulic pressure from the kit 10. For example, the bearings may have sizes of approximately nine sixteenths of an inch (9/16") to one inch (1").

Figure 1:
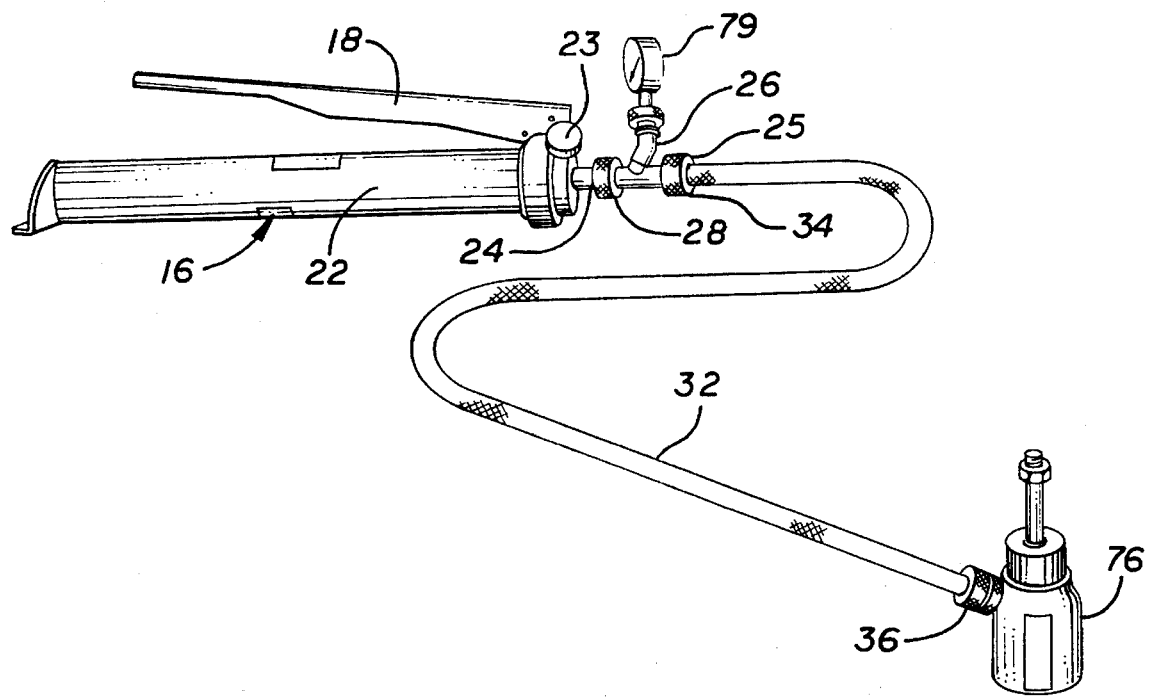
FIG. 1 is a perspective view of an assembled embodiment of apparatus formed from different tool kits included in one embodiment of the invention.

The kit 10 (FIG. 3) includes a hydraulic pump generally indicated at 16. The pump 16 includes a handle 18 manually movable upwardly and downwardly on a pin 20 providing a fulcrum for the movement of the handle. The pin 20 is disposed on a body 22 containing hydraulic fluid. When the handle 18 is repetitively moved upwardly and downwardly, the pressure of the hydraulic fluid in the body 22 is increased. A pressure control valve 23 (FIG. 1) may be closed to provide for a pumping of the hydraulic fluid. The pump 16 may constitute a purchased item well known in the art.

A coupler 24 is attachable to the body 22 and is provided with a pair of fittings 26 and 28. A meter or indicator 30 (FIG. 4) is attachable to the fitting 26 to indicate the hydraulic pressure generated by the pump 16. A hose 32 is provided at one end with a fitting 34 which is attachable to the fitting 28. The hose 32 is provided with a fitting 36 at the other end. When the handle 18 is repetitively moved upwardly and downwardly, a hydraulic pressure is produced through the hose 32 to the fitting 36.

The kit 12 (FIG. 4) includes a fitting 38 which is adapted to be coupled to the fitting 36. A clamp or press 40 in the shape of a C-frame is in turn attached to the fitting 38. The clamp 40 includes a pair of legs 42 and 44 which extend from the body of the C-frame clamp and define the opposite legs of the C configuration. The legs 42 and 44 are separated from each other by an adjustable distance to define a ram and to receive a pair of members such as dies, anvil dies, receiver dies and driver dies. The adjustment is provided by the hydraulic pressure which is applied through the fitting 38 to adjust the effective distance between the arms 42 and 44. The construction of the ram defined by the legs 42 and 44 and the movement of the ram in accordance with the application of hydraulic pressure is believed to be well known in the art.

Figure 2:
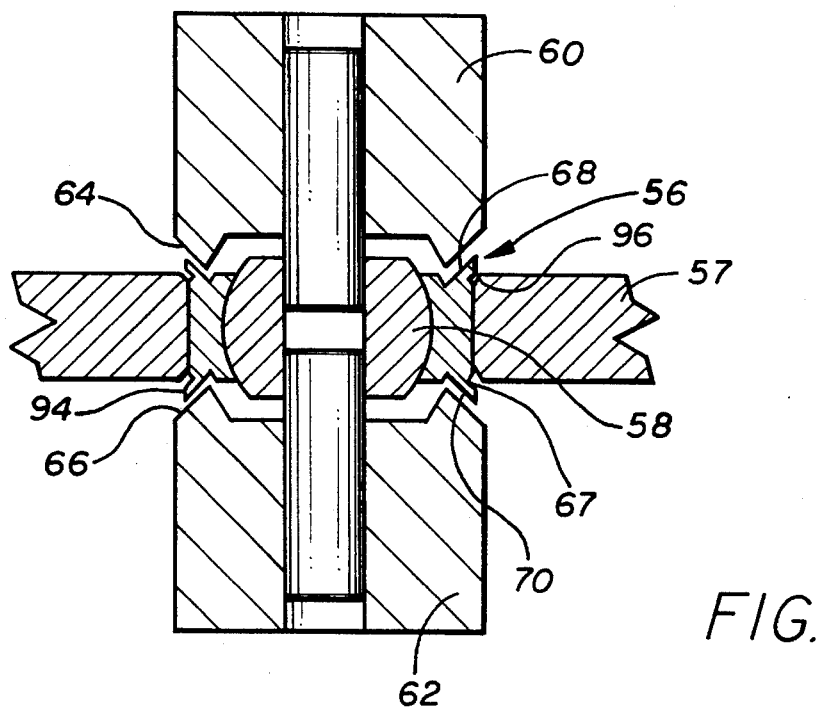
FIG. 2 is an enlarged fragmentary sectional view of a swaged bearing in a bearing assembly and of dies for swaging the bearing.
Figure 6:
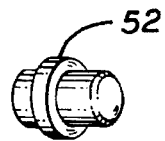
Figure 7:
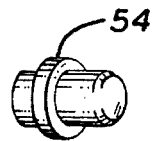

A receiver die 50 (FIG. 5), an anvil die 52 (FIG. 6) and a driver die 54 (FIG. 7) are respectively disposed on the arm 42 of the ram 48 to install a bearing generally indicated at 56 (FIG. 2), preferably spherical, on a housing 57 or to remove tile bearing from the housing. The receiver die 50, the anvil die 52 and the driver die 54 may be of different sizes to operate upon bearings of different sizes. The receiver die 50, the anvil die 52 and the driver die 54 may be provided with any configuration suitable to obtain the desired results. The receiver die 50, the anvil die 52 and the driver die 54 of different sizes may preferably be included in a separate kit (not shown) or they may be included in the kit 12. The construction of the receiver die 50, the anvil die 52 and the driver die 54 may be considered to be well known in the art.

Figure 8:
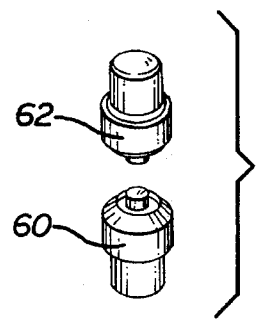

Alternatively, a swaging die set formed from dies 60 and 62 (FIG. 8) may be disposed on the leg 42 of the ram 48 to swage a prepared lip in a bearing race into a prepared chamfer in a housing. The swaging dies 60 and 62 may be respectively provided with annular lips 64 and 66 to fit into circumferential grooves 68 and 70 (FIG. 2) in the bearing. Because of the relative configurations of the annular lips 64 and 66 and the circumferential grooves 68 and 70, the lips of the race are swaged outwardly as die force is applied. The swaging dies 60 and 62 may be provided with different sizes to conform to the different sizes of the bearings. The dies 60 and 62 may be included in the separate kit (not shown) with the receiver dies 50, the anvil dies 52 and the driver dies 54. Alternatively, the swaging dies 60 and 62 may be included in the kit 12. The construction of the dies 60 and 62 may be considered to be well known in the art.

To remove a bearing 56 from a housing 57, one of the receiver dies 50 (FIG. 5) and one of the driver dies 54 (FIG. 7) are selected. The selection of the particular one of the receiver dies 50 and the particular one of the driver dies 54 is dependent upon the size of the bearing 56. The selected receiver die 50 and the selected driver die 54 are installed in the C-shaped clamp 40 which includes the hydraulic ram 48. The dies may be installed in either end of the C-shaped clamp 40. The pressure control valve 23 is closed and the pump 16 is operated to pressurize the ram 48 and push the bearing out of its housing into the receiver die 50. The pressure in the system will drop at this time. The pressure control valve 23 is then opened and the bearing 56 is removed. A C-frame support bracket may be provided for ease of handling.

Figure 5:
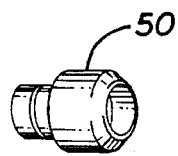
FIGS. 5–8 are plan views of different anvil dies, receiver dies, driver dies and swaging dies which may be included in a third kit for operation with the second kit to install a bearing of relatively small size in a housing, remove a bearing of relatively small size from a housing or swage a prepared lip in a bearing race of relatively small size into a prepared chamfer in a housing.

When it is desired to install a bearing 56 in a housing 57, an anvil die 52 (FIG. 6) of the proper size is used instead of a receiver die 50 (FIG. 5). The anvil die 52 is shaped for proper location of a bearing 56 in a housing 57. Before installing the bearing 56 in the housing 57, the housing should be inspected to insure that the chamfers in the housing are not damaged. The bearing 56 is then disposed on the shaft of the driver die 54 and the housing is disposed against the anvil die 52. The pressure control valve 23 on the hydraulic pump 16 is then closed and the pump is operated while holding the bearing components in position. This operation is continued until the gap is closed and the bearing begins to enter the housing bore. The pump is continued to be operated until the bearing 56 is pushed firmly against the anvil die 52. The pressure control valve 23 is opened and the assembled bearing 56 is removed. The bearing 56 is then visually verified as being centrally located in the housing 57 and as not protruding beyond the housing face.

To swage a prepared lip in a bearing race 67 into a prepared chamfer in a housing 57, swaging dies 60 and 62 (FIG. 8) of the proper size dependent upon the size of the bearing are selected. The selected dies 60 and 62 are installed in the C-shaped clamp 40. The pressure control valve 23 is closed and the pump 16 is operated slowly until it is verified that the bearing 56 is snug and aligned over the pilots of both dies. The pump is then operated to obtain the desired pressure for the swaging operation and the pressure control valve 23 is opened. The bearing 56 is subsequently inspected to insure that it is properly centered in the housing 57.

To provide a proof test of a swaged bearing, the receiver die 50 and the driver die 54 are installed in the same manner as when the bearing 56 is removed from the housing 57. A proof-test dial indicator is installed with its adaptor over the receiver die 50. While holding the bearing 56 properly positioned on the receiver die 50, the pressure control valve 23 on the hydraulic pump 16 is closed. The pump 16 is slowly operated to pressurize the system so that the bearing 54 is snug against the driver die 54. The dial indicator is positioned with its feeder just touching the bottom of the flange on the driver die 54. The indicator needle is then adjusted to approximately a position midway of the maximum needle travel and the dial face is then rotated to indicate a value of zero (o) for the needle position. The system is then pressurized to a specified proof force and the movement of the indicator needle is verified in accordance with the specified proof force. The pressure control valve 23 on the pump 16 is then opened.

Figure 3:
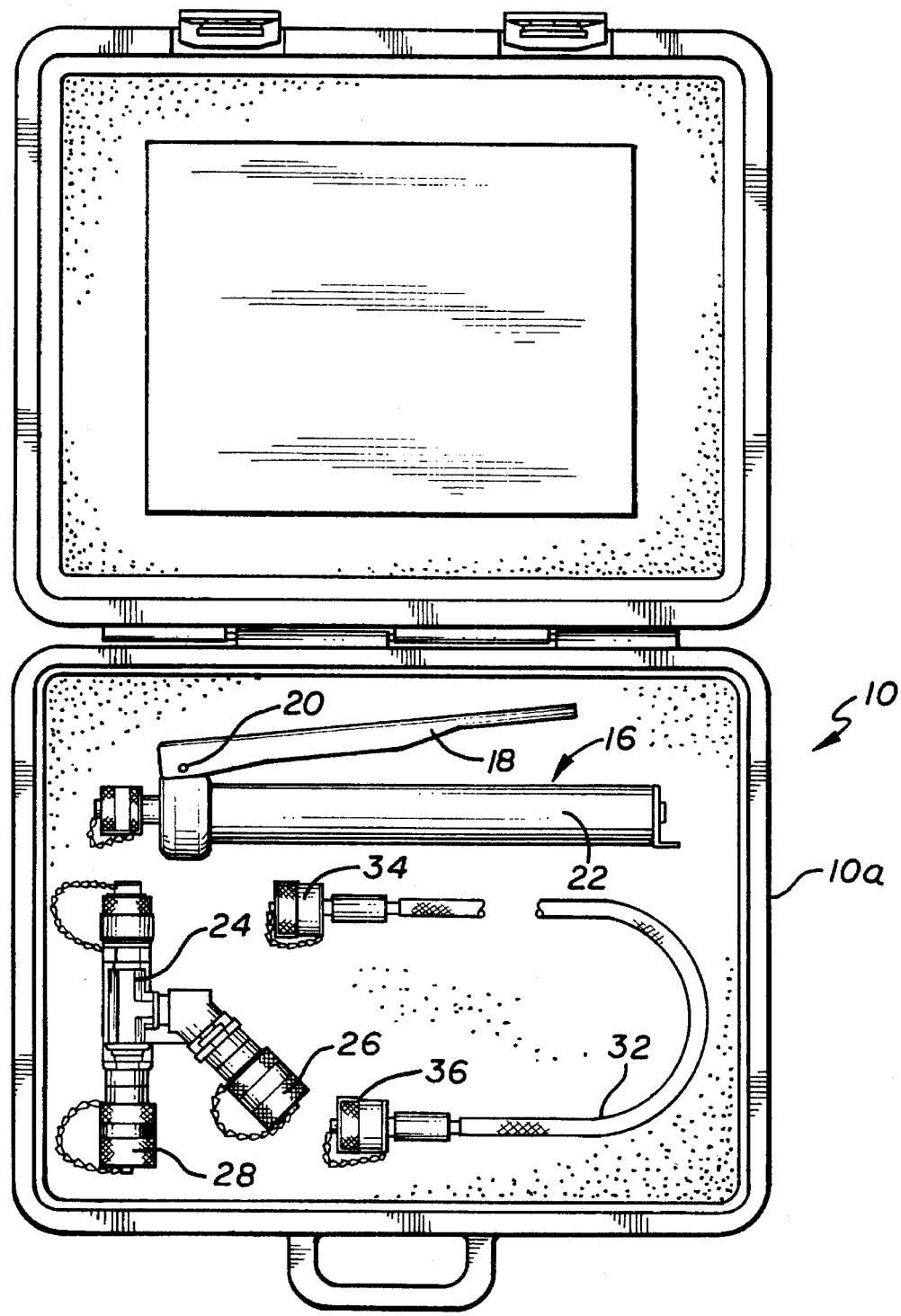
FIG. 3 is a plan view of the first tool kit, in an open position of the box housing the tool kit, containing different members for manual operation to produce a hydraulic pressure for installing a bearing in a housing, removing a bearing from a housing or swaging a prepared lip in a bearing race into a prepared chamfer in a housing.
Figure 4:
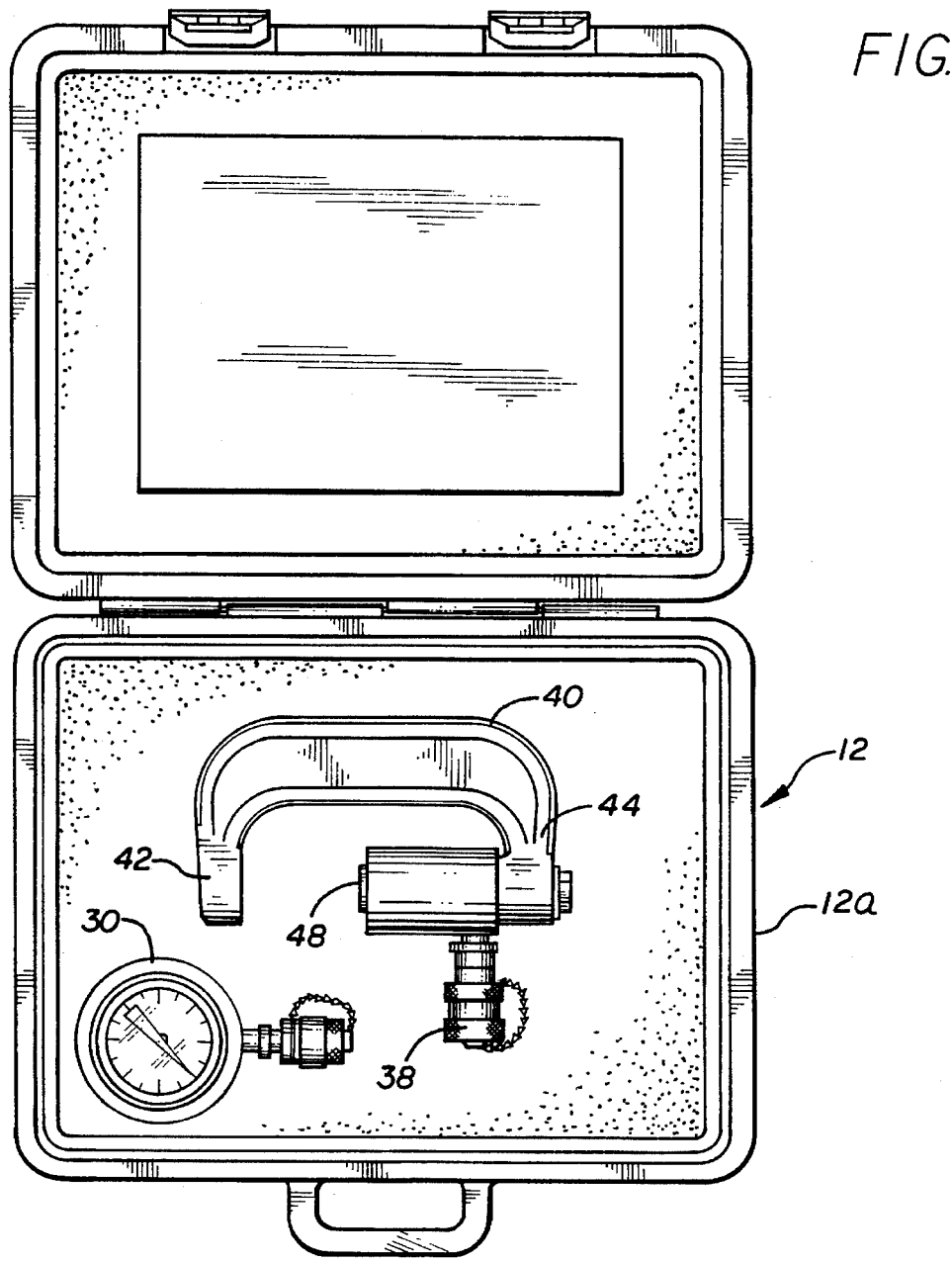
FIG. 4 is a plan view of the second tool kit, in an open position of the box housing the tool kit, including different members cooperative in an assembled relationship with the members of FIG. 3 for installing a bearing of relatively small size in a housing, removing a bearing of relatively small size from a housing or swaging a prepared lip in a bearing race of a relatively small size into a prepared chamfer in a housing.

For bearings of relatively large size, the kit 14 (FIG. 9) includes a press or ram 76 with a fitting 78 for coupling to the fitting 36 (FIG. 3). It also includes a pressure gauge 79. The press 76 may be a center pull press and may be constructed in a manner well known in the art. The press may be provided with a pair of dies which may be movable relative to each other in an in-line relationship in accordance with increases in hydraulic pressure applied to the press. The construction of the press 84 may be considered to be well known in the art 81.

A pull rod shaft 80 (FIG. 15) having a nut 81, receiver/anvil die 82 and a driver die 84 may be disposed on the jaws in the press 76 to remove a bearing 57 from a housing or install a bearing 56 in a housing 57. The selection of particular ones of a plurality of pull rod shafts 80, receiver/anvil die 82 and driver die 84 may be dependent upon the size of the bearing 56. The receiver/anvil die 82 are preferably dual purpose and are preferably configured with a receiver shape on one side and an anvil shape on the other side. The receiver/anvil die 82 and the driver dies 84 may be disposed in a fifth kit (not shown) and the pull rod shafts may be disposed in the kit 14 or in the fifth kit. Alternatively, the pull rod shafts 80 may be disposed in the kit with the receiver/anvil die 82 and the driver dies 84 or all of the pull rod shafts, the receiver/anvil die 82 and the driver die 84 may be disposed in the kit 14. The pull rod shafts 80, the receiver/anvil die 82 and the anvil die 84 may be constructed in a manner well known in the art. A swaging die set formed from die 86 and die 88 may also be disposed in the kit with the receiver/anvil die 82 and the driver die 84. The selection of the dies 86 and die 88 is dependent upon the size of the bearing 56. The construction of the swaging dies 86 and 88 may be considered to be well known in the art.

When it is desired to use the kit 14 to remove a bearing 56 of relatively large size from the housing 57, the center pull press 76 is coupled to the hose 32 and the gauge 79 is included in the hydraulic circuit. The pull shaft 80 of the proper size is installed securely in the center pull press 76. The nut 81 is then removed from the pull rod shaft 88 and the receiver/anvil die 82 of the proper size is installed on the pull rod shaft with the receiver end in play. The pull rod 80 shaft is inserted through the bearing 56 and is held in place while the driver die 84 of the proper size is installed on the shaft. The nut 81 is then screwed on the pull rod shaft 80 while preferably making sure that there is a full thread engagement between the nut and the pull rod shaft. The pressure control valve 23 on the hydraulic pump is then closed and the pump 16 is operated to pressurize the system and push the bearing 56 out of its housing and into the receiver die 82. It may be desirable to cut the annular lip on the bearing to facilitate bearing removal. The pressure in the system will drop at this time. The pressure control valve 23 is opened and the bearing 56 is removed. The receiver and driver dies are subsequently removed.

For installing a bearing 56 of relatively large size in a housing 57, the pull rod shaft 80 of the proper size is installed in the press 76 as described above and the nut 81 is removed from the shaft. The receiver/anvil die 82 of the proper size is then installed on the pull rod shaft 80 with the anvil side in play and the bearing 56 is placed on the pull rod shaft so that the bearing is centered on the housing 57 and the pull rod shaft 80 is inserted through the housing. The driver die is then installed on the shaft 80 and the nut 81 is screwed on the shaft so that there is preferably a full scale engagement between the nut and the shaft. The pressure control valve 23 on the hydraulic pump 16 is closed and the pump is operated until the bearing begins to enter the housing hole. The pump is then continued to be operated to the pounds of force necessary to push the bearing 56 against the anvil portion of the receiver/anvil die 82. The pressure control valve 23 is opened and the shaft 80 is removed from the assembled bearing 56. A visual inspection is then preferably made to verify that the bearing 56 is centrally located in the housing 57 and does not protrude beyond the face of the housing. The receiver/anvil die 82 and the driver die 84 are subsequently removed.

To swage a prepared lip in a bearing race 67 into a prepared chamfer in a housing 57, the nut 81 is removed from a pull rod shaft 80 of the proper size. The swaging die 88 is then installed on the pull rod shaft 80 and the bearing 56 is subsequently installed on the shaft. The bearing 56 is held in place on the shaft 80 which is inserted through the housing 57. The swaging die 86 is then installed on the shaft. The nut 81 is then screwed on the shaft 80 so that there is preferably a full thread engagement between the nut and the shaft. While the bearing 56 is held properly positioned on the pull rod shaft 80, the pressure control valve 23 on the pump 16 is closed and the pump is slowly closed to pressurize the system. This is preferably continued until the bearing 56 is snug and properly seated against the swaging die 86.

To provide a proof test of a swaged spherical bearing, the position of the receiver/anvil die 82 is reversed from its position when the bearing 56 is installed in the housing 57. An indicator 102 is then installed with its adaptor over the receiver die. The bearing 56 is then installed in the center pull press and is held in place while the driver die 84 is installed in the same manner as in the removal of the bearing 56 from the housing 57. The indicator is then positioned with its finger 104 just touching the bottom of the flange on the driver die 84. The indicator needle is adjusted to approximately half of its maximum range and the setting is adjusted to zero (0) by rotating the dial face. The pressure control valve 23 is closed and the pump is operated to pressurize the system to a specified proof force. The movement of the indicator needle is verified in accordance with the specified proof force. The pressure control valve 23 on the pump is then opened.

The tool kits 10, 12 and 14 and the dies in the fourth and fifth kits have certain distinctive advantages over the prior art. They provide for a reliable installation and centering of the bearing 56 (FIG. 2) on the housing 57 and for a reliable removal of the bearing from the housing. They also provide for a swaging of prepared lips in the bearings into prepared chamfers in housings to assure that the bearings are properly retained in the housings. The tool kits are easily portable manually and are adapted to provide for an operation on bearings of different sizes at any convenient position.

Figure 13:
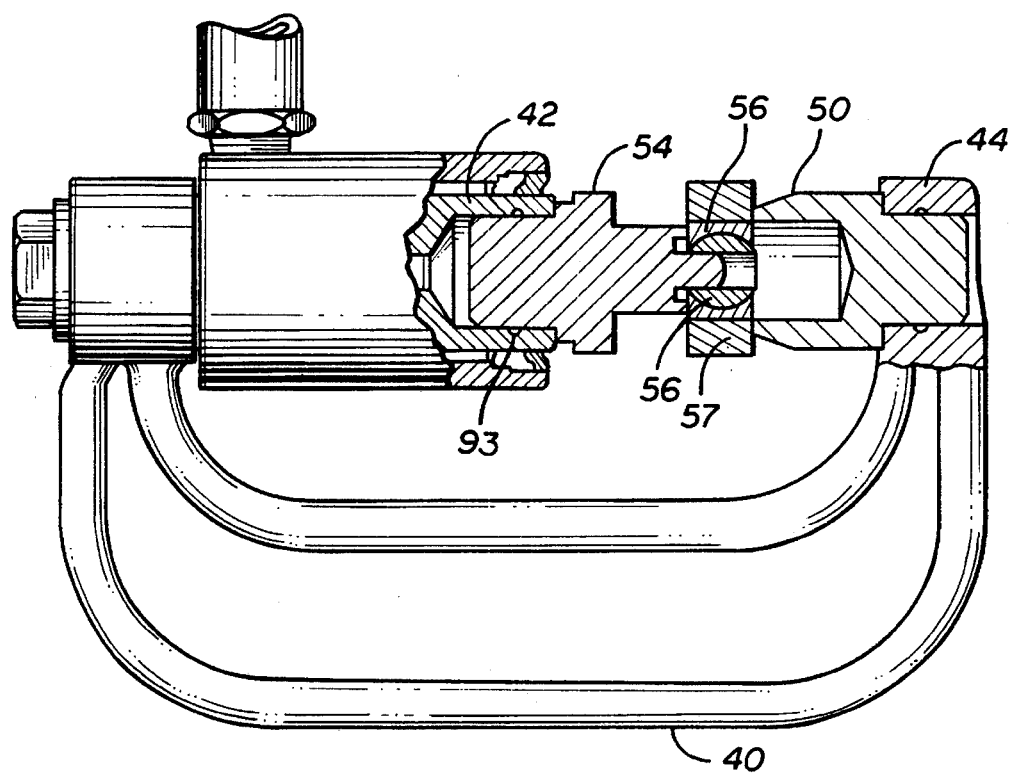
FIG. 13 is a sectional view of the clamp included in the second tool kit and of dies and a bearing and a housing in an assembled relationship for installing the bearing in the housing or removing the bearing from the housing when the bearing is of relatively small size.

FIG. 13 shows an assembled relationship of the C-shaped clamp or press 40, the receiver die 50 and the driver die 54 when the bearing is to be installed in the housing or is to be removed from the housing. As will be seen, the C-shaped clamp or press 40 includes the legs 42 and 44. The bearing 54 is press fitted in the leg 42 and is retained in the leg as by an O-ring 93. The leg 42 is movable in a first direction to install the bearing 56 in the housing 57. The leg 42 is movable in a second direction to remove the bearing 56 from the housing 57. When the bearing is to be swaged, the bearing and the swaging dies may have the relationship shown in FIG. 14.

Figure 14:
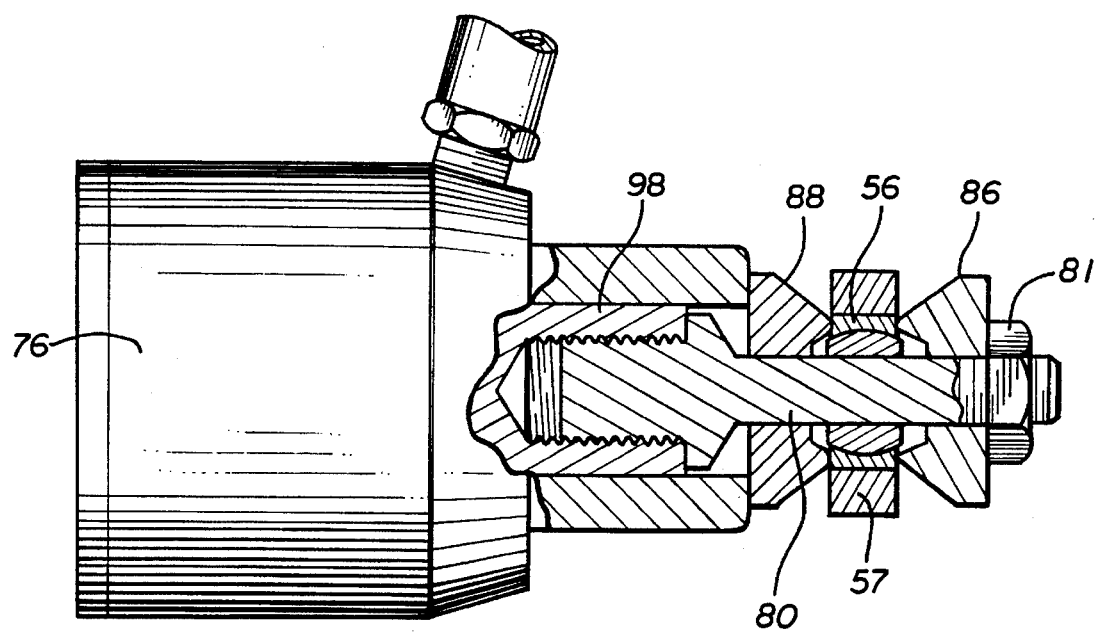
FIG. 14 is a sectional view of the clamp included in the third tool kit and dies and a bearing and a housing in an assembled relationship for swaging a prepared lip in the bearing into a prepared chamfer in the housing when the bearing has a relatively large size.

FIG. 14 shows an assembled relationship of the center pull press 76, the swaging dies 86 and 88, the pull rod shaft 80 and the nut 81 for swaging prepared lips 94 (FIG. 2) in the bearing 56 into prepared chamfer 96 in the housing 57. The pull rod shaft 80 is externally threaded and is disposed in a threaded holder 98 in the center pull press 76. When the center pull press 76 is subjected to hydraulic pressure, the pull rod shaft 80 is advanced in the holder 98 to move the swaging die 88 against the bearing 86 so as to provide the swaging action. When the press 76 is used to install the bearing 56 in the housing 57 or remove the bearing 56 from the housing 57, the bearings may have the relationship to the bearing 56 and the housing 57 as shown in FIG. 13.

Figure 15:
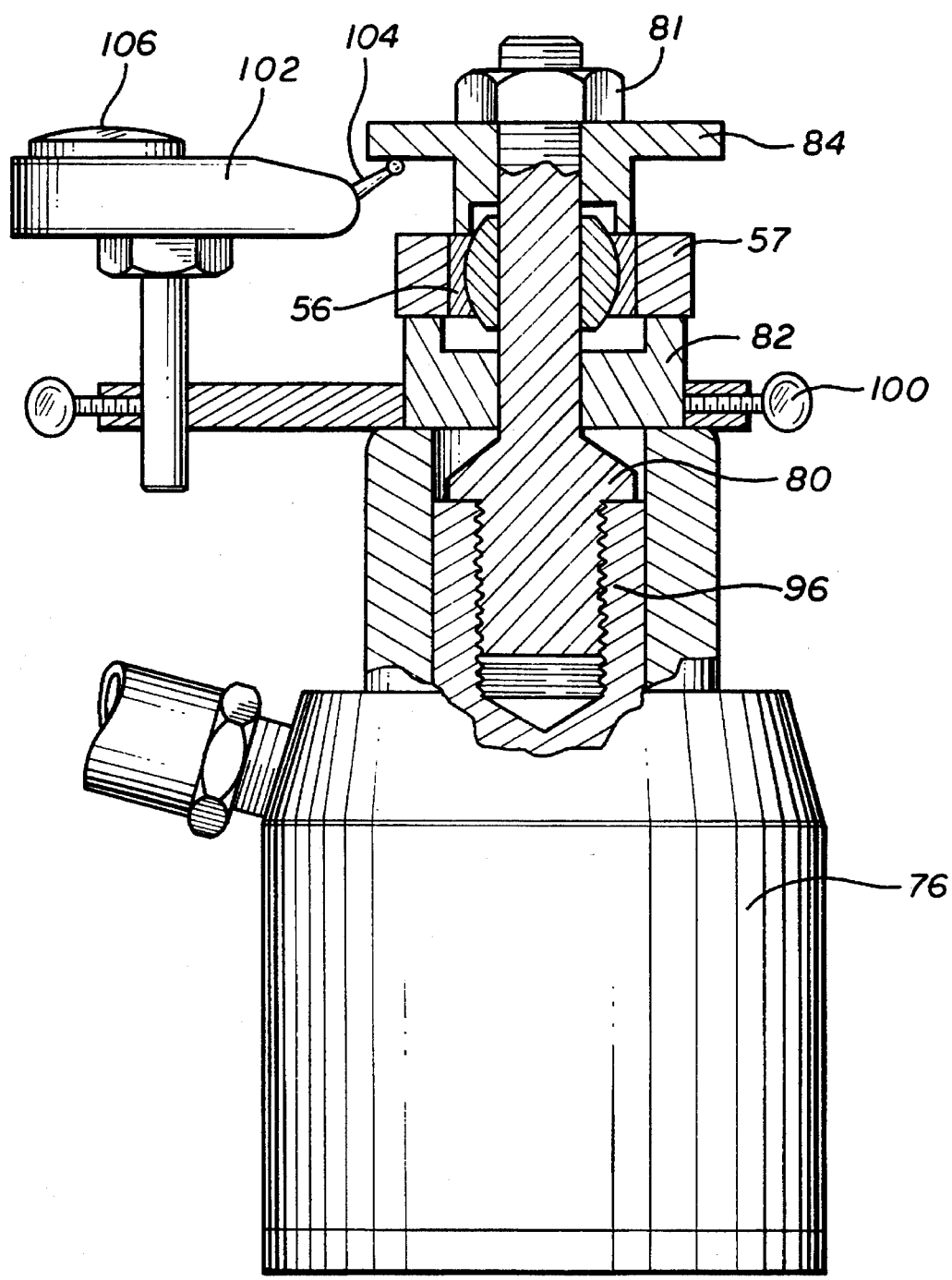
FIG. 15 is a sectional view of the clamp included in the third tool kit and dies and a bearing and a housing in an assembled relationship for proof testing the installation of the bearing in the housing when the bearing has a relatively large size.

FIG. 15 shows an assembled relationship of the center pull press 76, the receiver die 82, the driver die 84, the pull rod shaft 80 and the nut 81 when a proof testing of the bearing 57 swaged in the housing 56 is to be provided. As will be seen, the pull rod shaft 80 adjustably mates as by threads with a holder 96 extending from the press 76. The arrangement shown in FIG. 15 also includes a plate clamp 100 fixedly coupled to a dial indicator 102, which in turn abuts the driver die 84 through a finger 104. After the indicator needle on a dial 106 has been adjusted to approximately midway of the indicator needle travel and the dial face 106 has been rotated to set the needle to zero, the press 76 is operated to move the driver die 84 toward the receiver die 82. The setting of the needle after the completion of the movement of the driver die 84 toward the receiver die 82 indicates whether the bearing 56 has been properly swaged. A similar arrangement of the receiver die, the driver die, the plate clamp 100 and the dial indicator 102 may be provided when proof testing is to be provided with a C-shaped press 40 to determine whether the bearing has been properly swaged.

Although this invention has been disclosed and illustrated with reference to particular embodiments, the principles involved are susceptible for use in numerous other embodiments which will be apparent to persons skilled in the art. The invention is, therefore, to be limited only as indicated by the scope of the appended claims.

We claim:

1. In combination for proof testing a swaged bearing, a press, a receiver die, a driver die spaced from the receiver die for holding the swaged bearing between the receiver die and the driver die, a pull rod shaft extending from the press through the receiver die, the swaged bearing and the driver die for supporting the receiver die, the swaged bearing and the driver die, first means disposed on the pull rod shaft and against the driver die for adjustably positioning the driver die against the swaged bearing, an indicator having a dial and a pointer, second means supported on the press for holding the indicator, and third means extending between the indicator and the receiver die for imposing a force on the indicator in accordance with the adjustable positioning of the driver die to indicate the effectiveness of the swage in the bearing by such adjustments in the positioning of the driver die.

2. In a combination as set forth in claim 1 wherein holder means extend from the press, and the pull rod shaft adjustably mates with the holder means.

3. In a combination as set forth in claim 1 wherein the press is a center pull press.

4. In a combination as set forth in claim 1 wherein the driver die has a flange, and the third means includes a finger fixedly attached to the indicator and extending to an abutting relationship with the flange on the driver die.

5. In combination for proof testing a swaged bearing, a press, first means extending from the press in adjustable relationship to the press, a pair of dies disposed on the first means in spaced relationship to each other for holding the swaged bearing between the dies, second means adjustably positioned on the first means for adjustably positioning a first one of the dies in the pair against the swaged bearing, an indicator, third means supported on the press for holding the indicator in a fixed position, and fourth means extending between the indicator and the first one of the dies in the pair for imposing a force on the indicator in accordance with the adjustable positioning of the first one of the dies to provide an indication of the effectiveness of the swage in the bearing.

6. In a combination as set forth in claim 5 wherein the press is a center pull press.

7. In a combination as set forth in claim 6 wherein the first means includes a pull rod shaft extending from the press for supporting the pair of dies and the swaged bearing and further includes means adjustably disposed on the shaft for providing an adjustable force on the first one of the dies.

8. In a combination as set forth in claim 7, the fourth means includes a finger attached to the indicator and extending to an abutting relationship with the first one of the dies in the pair.

9. A method of proof testing a swaged bearing, including the steps of:

providing a press, coupling a pull rod shaft to the press, disposing a receiver die, the swaged bearing and a receiver die on the pull rod shaft, the receiver die having a flange, coupling an indicator in fixed relationship to the receiver die, the indicator having a dial face and a needle movable on the dial face in accordance with the force imposed upon the indicator, coupling the indicator to the receiver die at the flange in the receiver die, and moving the receiver die against the swaged bearing to indicate the effectiveness of the swage in the bearing in accordance with the reading of the needle on the dial face.

10. A method as set forth in claim 9 wherein the press is a center pull press.

11. A method as set forth in claim 10, including the steps of:

the dial face having progressive indications from a value of zero, adjusting the needle to a reading of an intermediate value on the dial face, thereafter adjusting the dial face to provide a zero reading by the needle, and thereafter moving the receiver die against the swaged bearing to indicate the effectiveness of the swage in the bearing in accordance with the reading of the needle on the dial face.

12. A method as set forth in claim 11 wherein a finger is attached to the indicator and is disposed in abutting relationship to the flange on the driver die and wherein the finger produces a deflection of the needle relative to the dial face in the indicator in accordance with the movement of the driver die against the swaged bearing.

* * * * *